Aug. 30, 1949.　　　　F. B. VOLTZ　　　　2,480,526
VEHICLE SPRING SUSPENSION
Filed July 10, 1945　　　　　　　　　　　　2 Sheets-Sheet 1

INVENTOR.
Francis Benedict Voltz
BY Glascock Downing & Seebohm
Attys

Aug. 30, 1949.                F. B. VOLTZ                2,480,526
                        VEHICLE SPRING SUSPENSION
Filed July 10, 1945                                   2 Sheets-Sheet 2
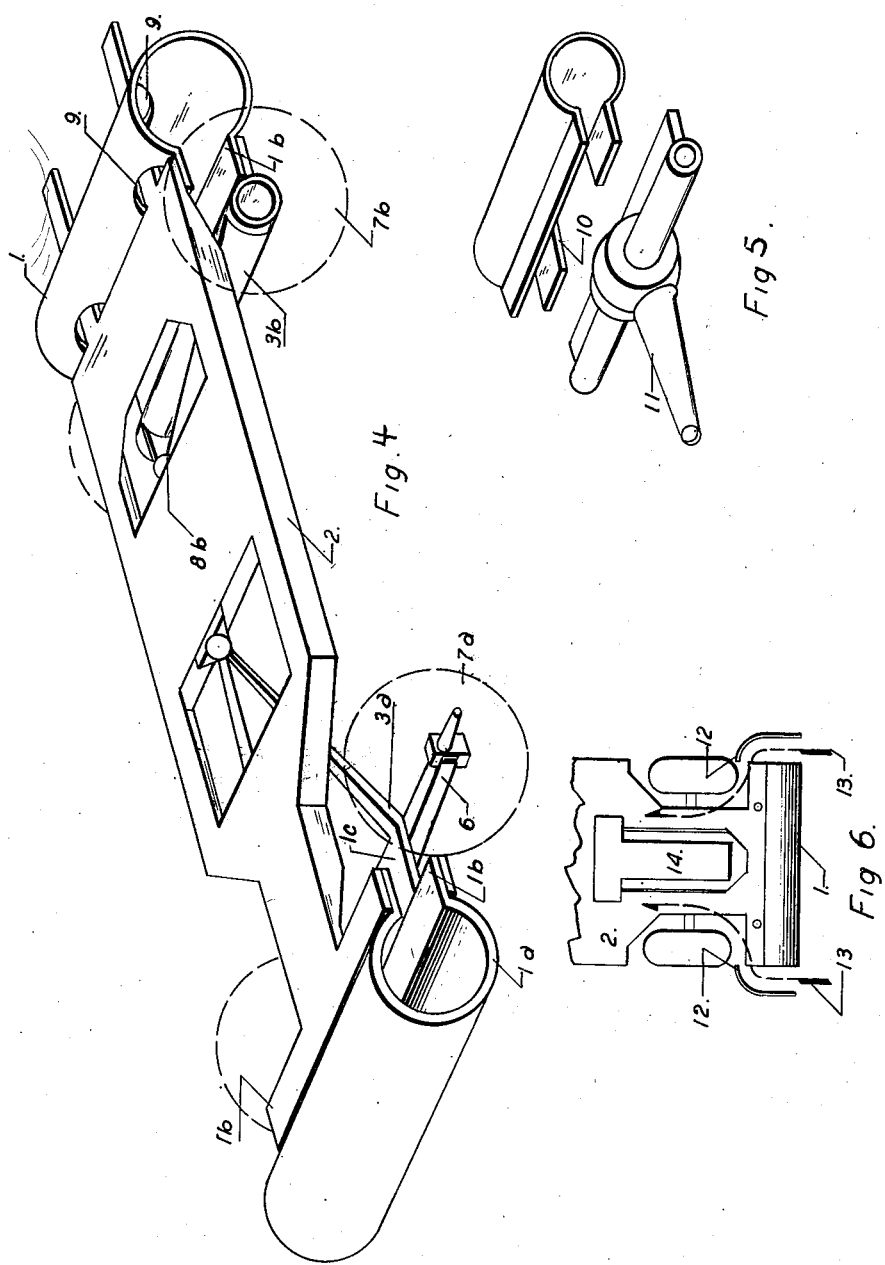
INVENTOR.
Francis Benedict Voltz
BY
Glascock H Downing H Seebold
Attys Patented Aug. 30, 1949

2,480,526

UNITED STATES PATENT OFFICE 2,480,526

VEHICLE SPRING SUSPENSION

Francis Benedict Voltz, Opelousas, La.

Application July 10, 1945, Serial No. 604,246

2 Claims. (Cl. 280—124)

This invention relates to spring suspension for vehicles and has for its object to provide an improved construction and arrangement of spring applicable to all forms of vehicles including motor driven and trailer types and by which the motion of the vehicle chassis is stabilized regardless of the shocks and jars imparted to the running gear due to irregularities of the road.

A further object is the provision of a spring having such form and so connected with the parts of the vehicle as to assist substantially in maintaining the axles in the proper relation to the chassis in the longitudinal direction thereof and insure proper wheel alignment.

A still further object is to provide a spring having an open hollow body portion extending throughout substantially the entire width of the chassis at each end thereof and disposed in such position as to receive and resiliently absorb the impact in case of collision.

In the accompanying drawing:

Figure 4 is a perspective view of the chassis, the vehicle wheels being shown in dotted lines.

Figure 5 is a detailed view in perspective.

Figure 6 is a plan view of the front of the vehicle showing a modification of the invention.

Figure 1:
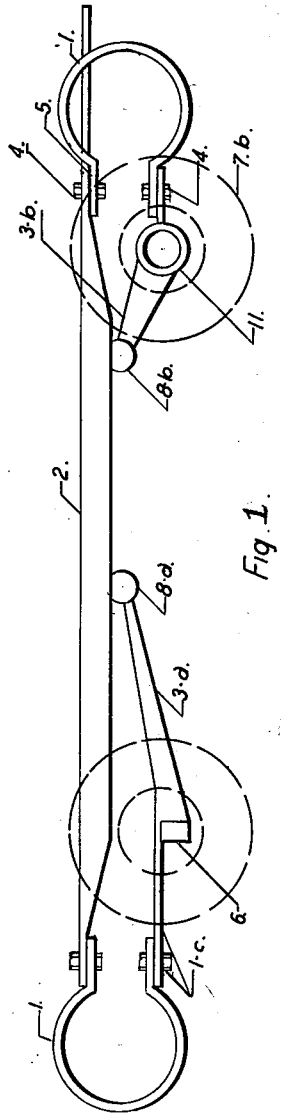
Figure 1 is a diagrammatic side elevation of the vehicle chassis showing the invention applied thereto.
Figure 2:
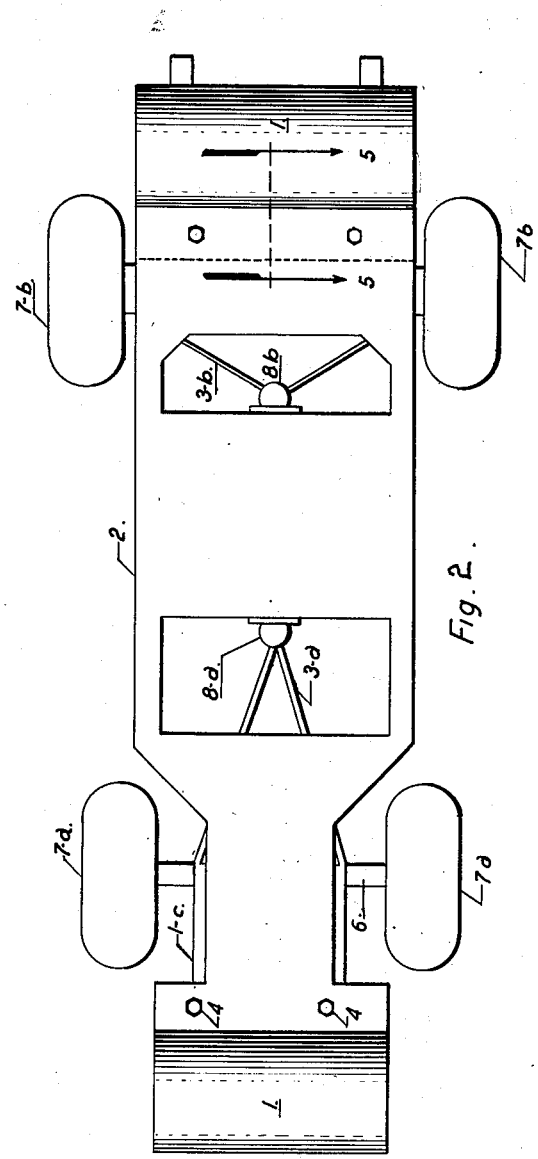
Figure 2 is a top plan view of the chassis.
Figure 3:
Figure 3 is a detailed sectional view showing the attachment of one of the springs to the chassis.

Referring to the drawing in detail, the numeral 2 indicates the chassis of a conventional motor driven vehicle although it will be understood that the invention may be applied to vehicles of various other types. The front and rear axles 6 and 11 constituting parts of the running gear are arranged below the chassis 2 and connected therewith by the improved springs designated generally at 1. The front axle 6 is connected by a torsion member 3a with the chassis at the point 8a while the rear axle 11 is similarly connected with the chassis by a torsion member 3b at the point 8b. The front and rear wheels are connected with the axle and are designated respectively at 7a and 7b.

The improved spring constructed in accordance with the invention consists of an open body 1a formed of sheet material of requisite thickness and preferably of such axial length as to correspond with the width of the chassis 2. The longitudinal edges of the body 1a are extended in substantially radial planes and constitute flat attaching flanges 1b, the body and flanges constituting an integral unit and being constructed of suitable resilient material. The normal shape of the spring without load is preferably such that the attaching flanges 1b extend divergently, whereas when applied to the vehicle the weight of the chassis, body and normal load of the vehicle is such as to bring the flanges into substantially parallel relation illustrated in the drawing.

The top flange 1b of the spring at the front of the motor vehicle is attached directly to the front member of the chassis 2 by bolts 4, whereas the lower attaching flange is secured to the front axle 6 by a separating plate 1c. In this position the cylindrical body part of the spring is disposed forwardly of the vehicle chassis and body in such position as to constitute a shock absorber receiving and absorbing the shock of impact in case of collision of the vehicle. The rear spring 1 is attached by means of its flange 1b and bolts 4 with the rear extremity of the chassis and the rear axle.

Although the body portion of the spring is illustrated as being of substantially cylindrical form, it will be understood that it may be of other similar shapes as may be found desirable. Also, the spring at the rear of the vehicle is provided with openings 9 for the projection of rear bumper supports attached to the rear part of the chassis and extending rearwardly therefrom. Also the bottom flange of the rear spring is cut away centrally as at 10 to accommodate the differential gear at the rear extremity of the drive axle housing 11.

The hollow body of the front spring and the space between the attaching flanges 1b thereof may be utilized as a channel for the circulation of air for cooling the engine, tires, and other parts of the vehicle, the motion of the air being indicated by the arrows 13. In this connection it is desirable to arrange deflectors 12 at the opposite open ends of the cylindrical body so disposed with relation thereto as to direct air into the spring during the forward motion of the vehicle to which the invention is applied.

To prevent the transmission of vibration from the running gear to the chassis and related parts through the springs, it is preferable to interpose sound and vibration damping springs 5 of suitable resilient material between the attaching flanges 1b and the parts of the vehicle to which they are attached.

What I claim is:

1. A vehicle suspension comprising a chassis, a running gear, and springs connecting the extremities of the chassis with the running gear, each spring including a substantially cylindrical hollow body portion open at both ends and extending throughout substantially the entire width of the chassis, spacing attaching flanges carried by the body and connected with the chassis and running gear, and deflectors arranged at extremities of at least one of said springs for directing air into said spring.

2. In a vehicle spring for supporting a chassis upon a running gear, the combination of a substantially cylindrical resilient hollow body extending transversely and throughout substantially the entire width of the chassis, and a pair of relatively spaced attaching flanges carried by said body and attached to said chassis and said running gear respectively, said hollow body having a substantially greater axial length than the diameter thereof and projecting outwardly beyond the end of the chassis to form a resilient fender therefor.

FRANCIS BENEDICT VOLTZ.

REFERENCES CITED

The following references are of record in the file of this patent:

UNITED STATES PATENTS

| Number | Name | Date |
|---|---|---|
| 215,958 | Morse | May 27, 1879 |
| 477,622 | Chapman | June 21, 1892 |
| 1,173,850 | Oliver | Feb. 29, 1916 |
| 1,393,618 | Gaines | Oct. 11, 1921 |
| 1,595,233 | Kriegbaum | Aug. 10, 1926 |
| 1,746,181 | Baldwin | Feb. 4, 1930 |
| 1,906,404 | Page, Jr. | May 2, 1933 |
| 2,175,527 | Klavik | Oct. 10, 1939 |
| 2,239,062 | Tallmadge | Apr. 22, 1941 |

FOREIGN PATENTS

| Number | Country | Date |
|---|---|---|
| 238,747 | Great Britain | Aug. 27, 1925 |